United States Patent
Zhang

(10) Patent No.: US 8,253,381 B2
(45) Date of Patent: Aug. 28, 2012

(54) CHARGING DEVICE

(75) Inventor: Ze-Biao Zhang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 437 days.

(21) Appl. No.: 12/627,042

(22) Filed: Nov. 30, 2009

(65) Prior Publication Data

US 2010/0253280 A1    Oct. 7, 2010

(30) Foreign Application Priority Data

Apr. 3, 2009  (CN) .......................... 2009 1 0301354

(51) Int. Cl.
*H02J 7/00* (2006.01)

(52) U.S. Cl. ........ 320/128; 320/107; 320/127; 320/132; 320/134; 320/136

(58) Field of Classification Search .................. 320/128
See application file for complete search history.

(56) References Cited

U.S. PATENT DOCUMENTS 5,408,170 A * 4/1995 Umetsu et al. ................ 320/148
5,672,952 A * 9/1997 Szepesi .......................... 320/164

FOREIGN PATENT DOCUMENTS

CN           2935577 Y       8/2007

* cited by examiner

*Primary Examiner* — Edward Tso
*Assistant Examiner* — Ahmed Omar
(74) *Attorney, Agent, or Firm* — Altis Law Group, Inc.

(57) ABSTRACT

A charging device for connecting a battery to a power supply to charge the battery includes a charging unit connected between one pole of the power supply and one pole the battery, a first switch unit connecting another pole of the battery with the charging unit and including a first switch connected between another pole of the power supply and the charging unit, and a second switch unit connected between another pole of the power supply and the charging unit. The power supply charges the battery through the second switch unit when the second switch unit is switched on, the first switch is automatically switched on in the charging process, the power supply charges the battery through the first switch after the second switch unit is switched off, and the first switch is automatically switched off when the battery is fully charged.

13 Claims, 1 Drawing Sheet

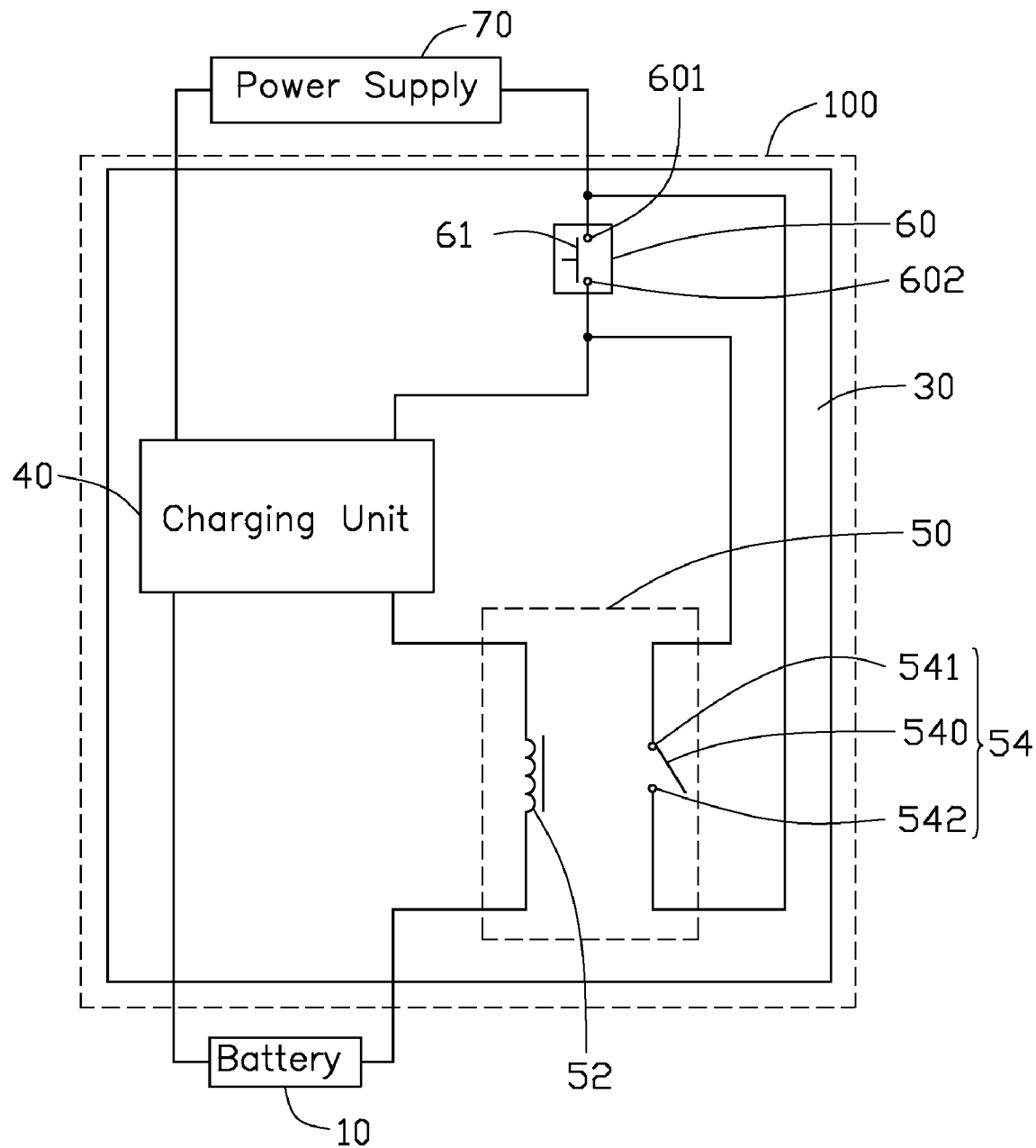

CHARGING DEVICE

BACKGROUND

1. Technical Field

The present disclosure relates to charging devices, and particularly to a charging device capable of conserving electric power.

2. Description of Related Art

Portable electronic devices, such as mobile phones, personal digital assistants (PDA) and laptop computers, are widely used. Most portable electronic devices use chargeable batteries as power supplies. When the electric energy of the batteries is exhausted, the portable electronic devices can be connected to other power supplies by chargers to charge the batteries.

However, in most conventional chargers, after the batteries connected to the chargers are fully charged, the charging processes cannot be automatically stopped, and the fully charged batteries will be continuously charged. Thus, the batteries may be overcharged, which may consume excess electric power and damage the batteries.

Therefore, there is room for improvement within the art.

BRIEF DESCRIPTION OF THE DRAWINGS

Many aspects of the present charging device can be better understood with reference to the following drawings.

The FIGURE is a circuit diagram of a charging device, according to an exemplary embodiment.

DETAILED DESCRIPTION

The FIGURE shows a charging device 100 according to an exemplary embodiment. The charging device 100 is used to charge a conventional rechargeable battery 10 used in portable electronic devices, e.g., mobile phones, personal digital assistants (PDA), laptop computers, etc. In use, the battery 10 can be electrically connected to a conventional power supply 70 by the charge device 100 to be charged.

The charging device 100 includes a housing 30, a charging unit 40, a first switch unit 50 and a second switch unit 60. The charging unit 40, the first switch unit 50 and the second switch unit 60 are all received in the housing 30. The charging unit 40 can be a conventional charger circuit. In use, the electric potential and current of the electric power outputted by the power supply 70 can be regulated to a predetermined charging electric potential and current. The regulated charging electric potential and current are input into the battery 10 by the charging unit 40 to charge the battery 10.

The first switch unit 50 can be a electromagnetic relay, which includes a winding 52 and a first switch 54 positioned adjacent to the winding 52. The first switch 54 includes an armature 540, a movable contact 541, and a stationary contact 542. The movable contact 541 includes a resilient device (not shown) for regulating the position of the armature 540 (e.g., a spring). The armature 540 is rotatably mounted on the movable contact 541, and is separable from the stationary contact 542 with a force provided by the movable contact 541 (e.g., a pressure of the spring mounted in the movable contact 541).

In use, a current passing through the winding 52 generates electromagnetic force in the winding 52, and the electromagnetic force can attract the armature 540. If the electromagnetic force is larger than the force separating the armature 540 from the stationary contact 542 (i.e., the force provided by the movable contact 541), the armature 540 can be attracted to rotate on the movable contact 541 and move towards the winding 52. Thus, the armature 540 contacts the stationary contact 542 and the first switch 54 is switched on. If the current passing through the winding 52 decreases, the electromagnetic force generated by the current also decreases. When the electromagnetic force is less than the force of the resilient device, the armature 540 is released from the electromagnetic force and is separated from the stationary contact 542 by the force provided by the movable contact 541. Thus, the first switch 54 is switched off. In the present disclosure, the resilient force provided by the movable contact 541 is regulated to be less than the electromagnetic force generated in the winding 52 by the charging current of a normally charging battery 10, and is larger than the electromagnetic force generated in the winding 52 by the charging current of a fully charged battery 10, i.e., a trickle charging current.

The second switch unit 60 can be a conventional button switch. The second switch unit 60 includes two contacts 601, 602, and an actuator 61. The contacts 601, 602 are both received in the housing 30, and the actuator 61 is mounted on an outside surface of the housing 30 for operation. When the actuator 61 is operated, the contacts 601, 602 can be electrically connected to each other or be separated from each other, such that the second switch unit 60 is switched on/off.

In assembly, a first end of the winding 52 is electrically connected to the charging unit 40. The movable contact 541 and the stationary contact 542 of the first switch 54 are correspondingly electrically connected to two ends of the second switch unit 60. The contact 602 of the second switch unit 60 is electrically connected to the charging unit 40.

When the charging device 100 is used with the power supply 70 to charge the battery 10, one pole of the power supply 70 is directly electrically connected to the charging unit 40, and another pole of the power supply 70 is electrically connected to the contact 601 of the second switch unit 60. Thus, the first switch 54 and the second switch unit 60 are connected in parallel between the power supply 70 and the charging unit 40. One pole of the battery 10 is directly electrically connected to the charging unit 40, and another pole of the battery 10 is electrically connected to a second end of the winding 52 opposite to the first end of the winding 52, i.e., connected to the charging unit 40 through the winding 52. Thus, the two poles the battery 10 are both connected to the charging unit 40 to form a charge loop.

In use, the actuator 61 is operated to electrically connect the two contacts 601, 602 to each other, and thus the two poles of the power supply 70 are both connected to the charging unit 40 (i.e., directly or through the second switch unit 60) to form a subsidiary power supplying loop. Thus, the power supply 70 outputs electric power to the charging unit 40. The charging unit 40 regulates the electric potential and current of the electric power outputted by the power supply 70 to be predetermined charging electric potential and current for charging the battery 10, and outputs the electric power to the battery 10 to charge the battery 10.

When the charging process starts, a charging current passes through the winding 52 and generates electromagnetic force. The armature 540 is attracted by the electromagnetic force to rotate on the movable contact 541 and move towards the winding 52 until the armature 540 contacts the stationary contact 542. Thus, the first switch 54 is switched on. The power supply 70 has one pole directly connected to the charging unit 40 and another pole connected to the charging unit 40 through the first switch 54, thereby forming a main power supplying loop. Besides the subsidiary power supplying loop, the power supply 70 also outputs electric power to the charging unit 40 through the main power supplying loop to charge the battery 10.

The status of the first switch 54 can be detected and shown by a conventional indicating circuit (not shown) of the portable electronic device. After the first switch 54 is switched on, the second switch unit 60 is switched off (e.g. by operating the actuator 61) to shut off the subsidiary power supplying loop, such that the power supply 70 only outputs electric power to the charging unit 40 through the main power supplying loop to charge the battery 10. Before the battery 10 is fully charged, the first switch 54 remains switched on since the charging current passing through the winding 52 does not decrease.

When the battery 10 is fully charged, the battery 40 enters a trickle charge process, wherein the charging unit 40 outputs electric power having a small current to the battery 10. In the trickle charge process, the current passing through the winding 52 lessens and does not generate enough electromagnetic force that can attract the armature 540 to contact the stationary contact 542. Thus, the armature 540 separates from the stationary contact 542 by the force provided by the movable contact 541, and then the first switch 54 is switched off. In this way, the main power supplying loop is shut off, the power supply 70 cannot output electric power to the charging unit 40, and the charging process is automatically stopped.

In the present disclosure, when the power supply 70 charges the battery 10 through the charge device 100, the charging device 100 can automatically stop the charging process when the battery 10 is fully charged. Therefore, the charging device 100 can prevent the battery 10 from overcharging, which conserves electric power and protects the battery 10 from being damaged by overcharge. Additionally, the charging device 100 can further includes a conventional central processing unit (CPU) installed in the housing and electrically connected to the first switch unit 50 and the second switch unit 60 for automatically detecting the status of the first switch 54 and switching off the second switch unit 60 when the first switch 54 is switched on.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A charging device for connecting a battery to a power supply to charge the battery, comprising:
    a charging unit connected between one pole of the power supply and one pole the battery;
    a first switch unit connecting another pole of the battery with the charging unit, the first switch unit including a first switch connected between another pole of the power supply and the charging unit; and
    a second switch unit connected between another pole of the power supply and the charging unit; wherein the power supply charges the battery through the second switch unit when the second switch unit is switched on, the first switch is automatically switched on in the charging process, the power supply charges the battery through the first switch after the second switch unit is switched off, and the first switch is automatically switched off when the battery is fully charged.

2. The charging device as claimed in claim 1, wherein the first switch unit is an electromagnetic relay.

3. The charging device as claimed in claim 1, wherein the first switch unit further includes a winding positioned adjacent to the first switch, the winding having one end connected to the charging unit and another end for being connected to the battery.

4. The charging device as claimed in claim 3, wherein the first switch includes an armature, a movable contact and a stationary contact, the armature is rotatably mounted on the movable contact, and is separated from the stationary contact by a force provided by the movable contact.

5. The charging device as claimed in claim 4, wherein charging current passing through the winding generates electromagnetic force in the winding, the electromagnetic force attracts the armature to contact the stationary contact, thereby switching on the first switch.

6. The charging device as claimed in claim 5, wherein the armature is separated from the stationary contact by the force provided by the movable contact when the current passing through the winding decreases such that the electromagnetic force generated by the charging the battery is less than the force provided by the movable contact, thereby switching off the first switch.

7. The charging device as claimed in claim 6, wherein the force provided by the movable contact is less than the electromagnetic force generated in the winding by the charging current of a normally charging battery, and is larger than the electromagnetic force generated in the winding by the charging current of a fully charged battery.

8. A charging device for connecting a battery to a power supply to charge the battery, comprising:
    a charging unit connected between one pole of the power supply and one pole the battery;
    a first switch unit connected to the charging unit, the first switch unit including a winding connecting another pole of the battery with the charging unit, and a first switch connected between another pole of the power supply and the charging unit; and
    a second switch unit connected between another pole of the power supply and the charging unit; wherein the power supply charges the battery through the second switch unit when the second switch unit is switched on, a charging current passing through the winding generates electromagnetic force to switch on the first switch, and the power supply charges the battery through the first switch after the second switch unit is switched off.

9. The charging device as claimed in claim 8, wherein the first switch is automatically switched off when the battery is fully charged.

10. The charging device as claimed in claim 8, wherein the first switch includes an armature, a movable contact and a stationary contact, the armature is rotatably mounted on the movable contact, and is separated from the stationary contact by a force provided by the movable contact.

11. The charging device as claimed in claim 10, wherein charging current passing through the winding generates electromagnetic force in the winding, the electromagnetic force attracts the armature to contact the stationary contact, thereby switching on the first switch.

12. The charging device as claimed in claim 11, wherein the armature is separated from the stationary contact by the force provided by the movable contact when the current passing through the winding decreases such that the electromagnetic force generated by the charging the battery is less than the force provided by the movable contact, thereby switching off the first switch.

13. The charging device as claimed in claim 12, wherein the force provided by the movable contact is less than the electromagnetic force generated in the winding by the charging current of a normally charging battery, and is larger than the electromagnetic force generated in the winding by the charging current of a fully charged battery.

* * * * *